United States Patent
MacArthur et al.

(10) Patent No.: US 10,209,053 B2
(45) Date of Patent: Feb. 19, 2019

(54) TOOL CALIBRATION SYSTEM

(71) Applicant: Honda Motor Co., Ltd., Tokyo (JP)

(72) Inventors: Benjamin MacArthur, Barrie (CA); Darrell Lindsay Hastings, Mount Forest (CA); Tom Bosiljevac, Mulmur (CA)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 15/457,296

(22) Filed: Mar. 13, 2017

(65) Prior Publication Data

US 2018/0259314 A1   Sep. 13, 2018

(51) Int. Cl.
*G01B 5/24* (2006.01)
*G01B 5/25* (2006.01)
*B25B 23/00* (2006.01)
*B25B 13/08* (2006.01)

(52) U.S. Cl.
CPC ............... *G01B 5/25* (2013.01); *B25B 23/00* (2013.01); *B25B 13/08* (2013.01)

(58) Field of Classification Search
CPC .................................... G01B 5/24; G01B 5/25
USPC .................................................. 33/1 N, 201
See application file for complete search history.

(56) References Cited

U.S. PATENT DOCUMENTS

| 404,451 | A |  | 6/1889 | Waggoner |  |
|---|---|---|---|---|---|
| 1,840,685 | A |  | 1/1932 | Witherup |  |
| 4,569,139 | A | * | 2/1986 | Wakeling | G01B 5/025 33/555.4 |
| 4,635,370 | A | * | 1/1987 | Beaver | G01B 3/166 33/495 |
| 5,697,166 | A | * | 12/1997 | Hommel | B25B 13/12 33/758 |
| 5,735,054 | A | * | 4/1998 | Cole | B23D 59/002 33/471 |
| 5,775,184 | A |  | 7/1998 | Cole |  |
| 5,931,063 | A |  | 8/1999 | Kuo |  |
| 6,584,698 | B1 |  | 7/2003 | Liu |  |
| 6,792,831 | B2 | * | 9/2004 | Crosser | B25B 13/56 33/758 |
| 2007/0157484 | A1 | * | 7/2007 | Grubler | B25B 7/00 33/679.1 |
| 2007/0294904 | A1 | * | 12/2007 | Jacobs | G01B 3/205 33/679.1 |
| 2011/0061252 | A1 | * | 3/2011 | Cerwin | B25H 7/02 33/414 |
| 2013/0097884 | A1 | * | 4/2013 | Hayworth | G01B 3/166 33/808 |

(Continued)

FOREIGN PATENT DOCUMENTS

| CN | 2526111 Y | 12/2002 |
|---|---|---|
| FR | 2371998 B1 | 1/1982 |
| GB | 2054429 B | 2/1983 |

*Primary Examiner* — G. Bradley Bennett
(74) *Attorney, Agent, or Firm* — Armstrong Teasdale LLP

(57) ABSTRACT

A tool calibration system includes a tool and a wrench pivotally coupled to the tool. The tool calibration system also includes a tool calibration device coupled to the tool and to the wrench. The tool calibration device includes a baseplate including an arcuate slot defined therein and a pin coupled to the baseplate and slidably moveable along the slot. The pin is configured to engage the wrench such that movement of the pin along the slot causes rotation of the wrench.

20 Claims, 3 Drawing Sheets

(56) References Cited

U.S. PATENT DOCUMENTS

| | | | | |
|---|---|---|---|---|
| 2014/0039810 A1* | 2/2014 | Wener | ............... | B25B 23/1425 |
| | | | | 702/41 |
| 2016/0169654 A1* | 6/2016 | Howard | ................. | G01B 3/20 |
| | | | | 33/783 |
| 2018/0023934 A1* | 1/2018 | Gjertsen | ................. | G01B 3/08 |
| | | | | 33/809 |

* cited by examiner

TOOL CALIBRATION SYSTEM

BACKGROUND

The field of the present disclosure relates generally to a system for use in calibrating a tool, more specifically, to a tool calibration device for calibrating a crow foot wrench and a tool.

At least some known vehicles, such as automobiles, require specific tooling to perform assembly and maintenance. Such tooling includes a crow foot wrench coupled to the head of a powered tool. In at least some circumstances, the crow foot wrench needs to be attached to the tool head in a predetermined orientation in order to perform tightening or fastening operations for vehicle assembly. An improperly aligned wrench may be responsible for leaking pipes or hoses and may result in a shortened service lifetime of the tool.

In at least some circumstances, a technician may visually inspect the workpiece and estimate the correct angle in which to set the crow foot wrench with respect to the tool in order to complete the required service. However, if the crow foot wrench is not correctly oriented with respect to the tool head, much of the torque applied by the tool may be directed to a surface or component different than that intended, which may result in unacceptable tightening or fastening or a shortened service lifetime of the tool. As such, improper alignment of the crow foot wrench with the tool head may result in undesired increased parts costs, labor costs, and service time.

BRIEF DESCRIPTION

In one aspect, a tool calibration device for use with a tool and a wrench is provided. The tool calibration device includes a baseplate including an arcuate slot defined therein and a pin coupled to the baseplate and slidably moveable along the slot. The pin is configured to engage the wrench such that movement of the pin along the slot causes rotation of the wrench.

In another aspect, a tool calibration system is provided. The tool calibration system includes a tool and a wrench pivotally coupled to the tool. The tool calibration system also includes a tool calibration device coupled to the tool and to the wrench. The tool calibration device includes a baseplate including an arcuate slot defined therein and a pin coupled to the baseplate and slidably moveable along the slot. The pin is configured to engage the wrench such that movement of the pin along the slot causes rotation of the wrench.

DETAILED DESCRIPTION

The embodiments described herein relate generally to a tool calibration system. More specifically, the tool calibration system described herein uses a tool calibration device to facilitate proper alignment of a crow foot wrench and a tool. Previously, a technician may visually inspect the workpiece and estimate the correct angle in which to set the crow foot wrench with respect to the tool in order to complete the required service. However, an improperly aligned wrench may be responsible for leaking pipes or hoses and may result in a shortened service lifetime of the tool. The tool calibration system describe herein enables the technician to engage the crow foot wrench with a moveable pin and then slide the pin along a slot to a desired angle indicator to adjust the orientation of the crow foot wrench such that the pin corresponds to a predetermined angle setting with respect to the tool to which the crow foot wrench is coupled. Once the angle is set, the technician can tighten a fastener to maintain the position of the crow foot wrench. As long as the fastener is kept tightened, the technician can confirm the alignment of the tool and crow foot wrench by inserting the tool with the crow foot wrench into the tool calibration device, for example at the beginning of a shift, to verify the crow foot wrench is in the proper orientation.

Figure 1:
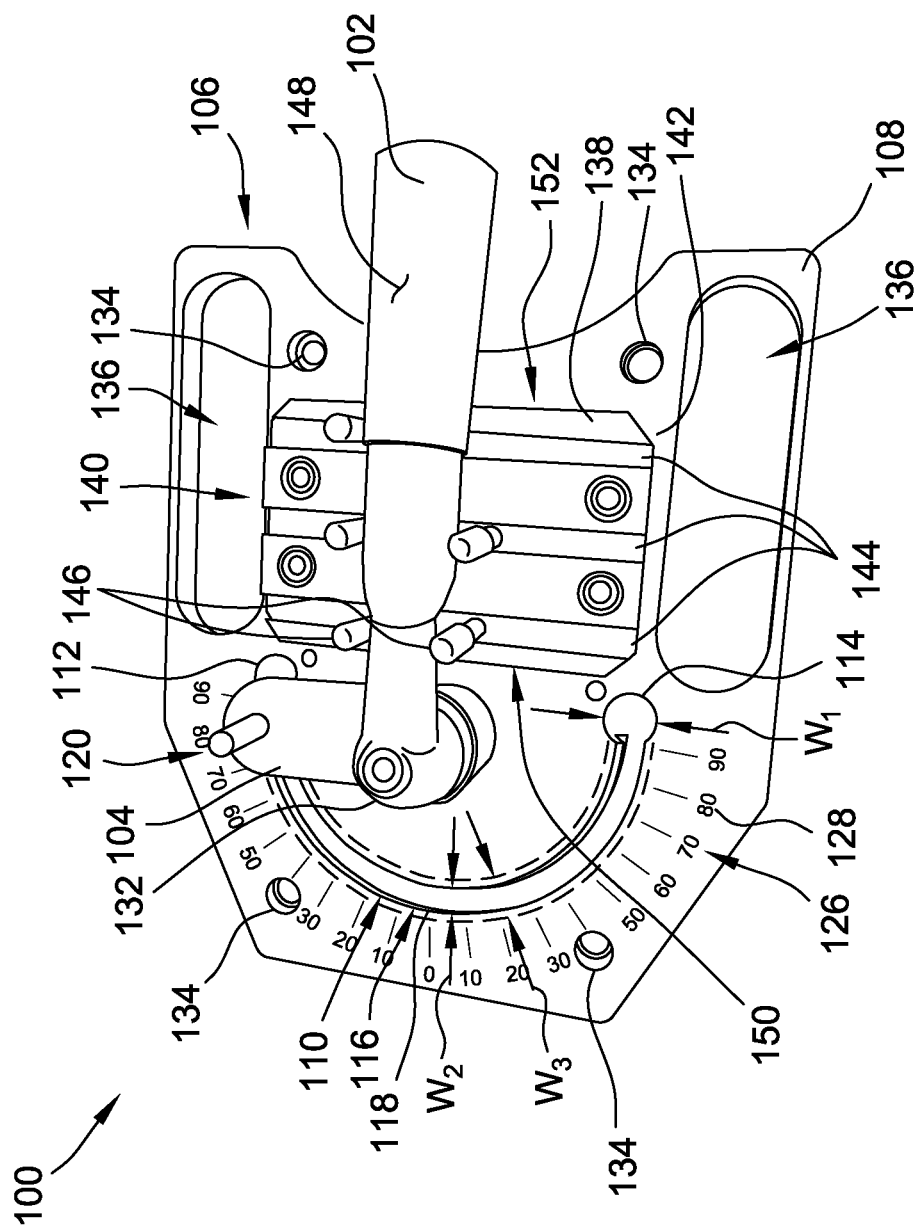
FIG. 1 is an illustration of an exemplary system that may be used to calibrate a tool.
Figure 2:
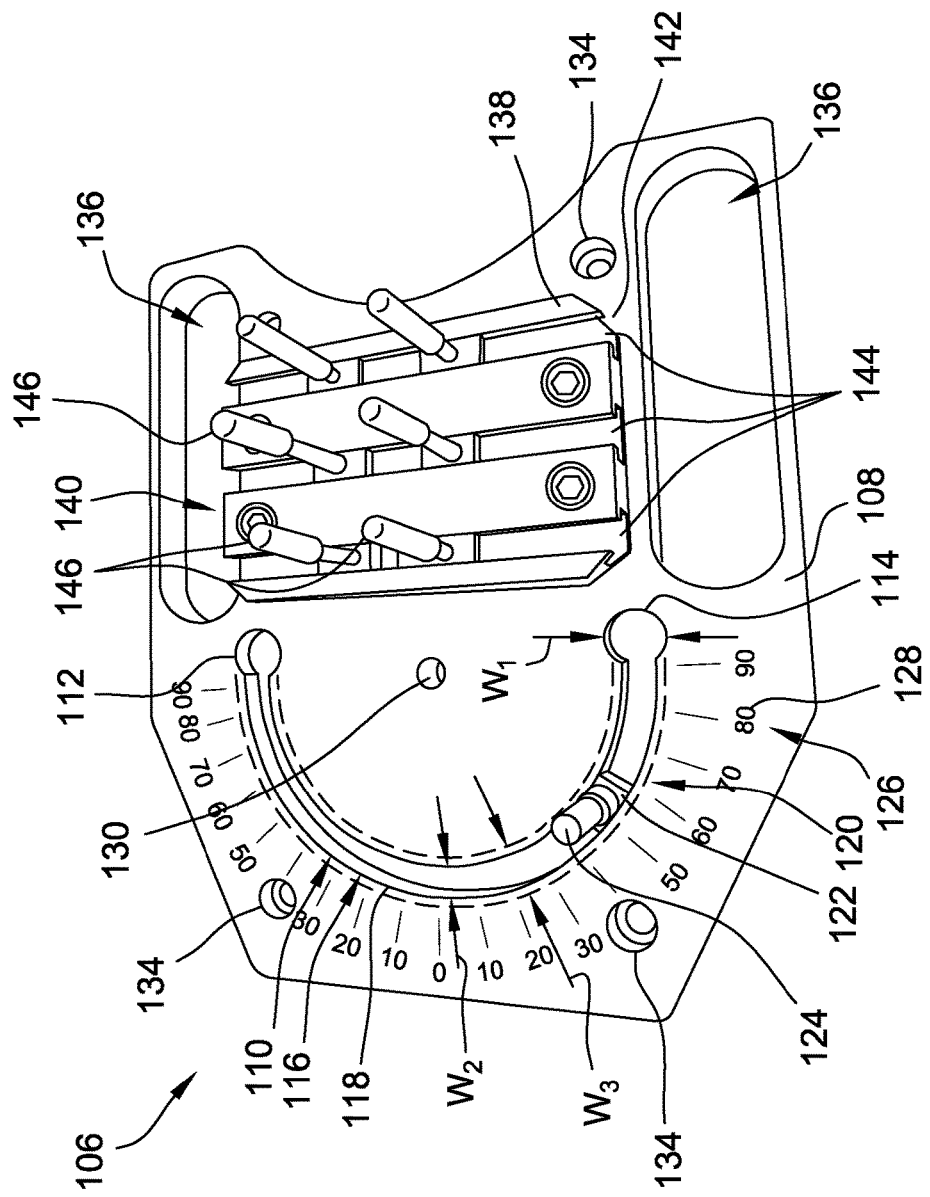
FIG. 2 is an illustration of an exemplary tool calibration device of the system shown in FIG. 1.

FIG. 1 is an illustration of an exemplary tool calibration system 100 including a tool 102, a crow foot wrench 104, and a tool calibration device 106. FIG. 2 is an illustration of tool calibration device 106 with tool 102 and wrench 104 removed for clarity. Device 106 includes a baseplate 108 having an arcuate slot 110 defined therein. Slot 110 includes a first end 112, an opposing second end 114, and a body portion 116 extending therebetween. First end 112 and second end 114 include a first width W1, and body portion 116 includes a second width W2 smaller than the first width W1. Furthermore, baseplate 108 includes a pair of flanges 118 that extend partially over slot 110 such that the distance between flanges 118 defines second width W2 of slot 110. Below flanges 118, slot 110 includes a third width W3 that is substantially similar to second width W2 of slot ends 112 and 114.

Device 106 also includes a pin 120 coupled to baseplate 108 and slidably moveable along slot 110. Pin 120 engages wrench 104 such that movement of pin 120 along slot 110 causes rotation of wrench 104, as described in further detail below. As shown in FIG. 2, pin 120 includes a base portion 122 and a post 124. Base portion 122 is positioned within slot 110 and is slidably moveable along slot 110 as desired by a technician. Post 124 is coupled to base portion 122 and engages wrench 104 such that movement of post 124 and base portion 122 along slot 110 causes rotation of wrench 104. More specifically, base portion 122 is sized to be positioned within slot 110 beneath flanges 118 such that flanges 118 retain base portion 122 within slot 110. As described above, first end 112 and second end 114 include a larger first width W1 than second width W2 of body portion 116. As such, base portion 122 is inserted into one of first end 112 or second end 114 and is slidably moveable along body portion 116.

Baseplate 108 also includes a scale 126 extending along the arc length of body portion 116 of slot 110. Scale 126 includes a plurality of indicators 128 that designate an angle measurement with respect to tool 102. More specifically, in operation, scale 126 enables a technician to slide pin 120 along slot 110 to a desired predetermined angle indicator 128 to set the angle of wrench 104 with respect to tool 102. Baseplate 108 also includes an alignment opening 130 configured to receive a head 132 of tool 102. Alignment opening 130 is positioned at a center point of arcuate slot 110 and represents a rotational axis of wrench 104 with respect to tool head 132. As such, alignment opening 130 facilitates aligning wrench 104 with head 132 to enable calibration of tool 102 and wrench 104.

As shown in FIGS. 1 and 2, baseplate 108 also includes a plurality of mounting apertures 134 for mounting tool calibration device 106 to a surface. Furthermore, baseplate 108 includes a pair of handle openings 136 positioned proximate first end 112 and second end 114 of slot 110.

In some embodiments, tool calibration device 106 further includes a tool support plate 138 coupled to baseplate 108. Tool support plate 138 is positioned between handle openings 136 and maintains the position of tool 102 while the technician is setting the alignment of wrench 104. In some embodiments, tool support plate 138 includes a first end 140, an opposing second end 142, and a plurality of grooves 144 extending a full distance between ends 140 and 142. In other embodiments, grooves 144 extend less than a full distance between ends 140 and 142. Although three grooves 144 are shown in FIGS. 1 and 2, tool support plate 138 includes any number of grooves 144 to facilitate operation of tool calibration device 106 as described herein.

Figure 3:
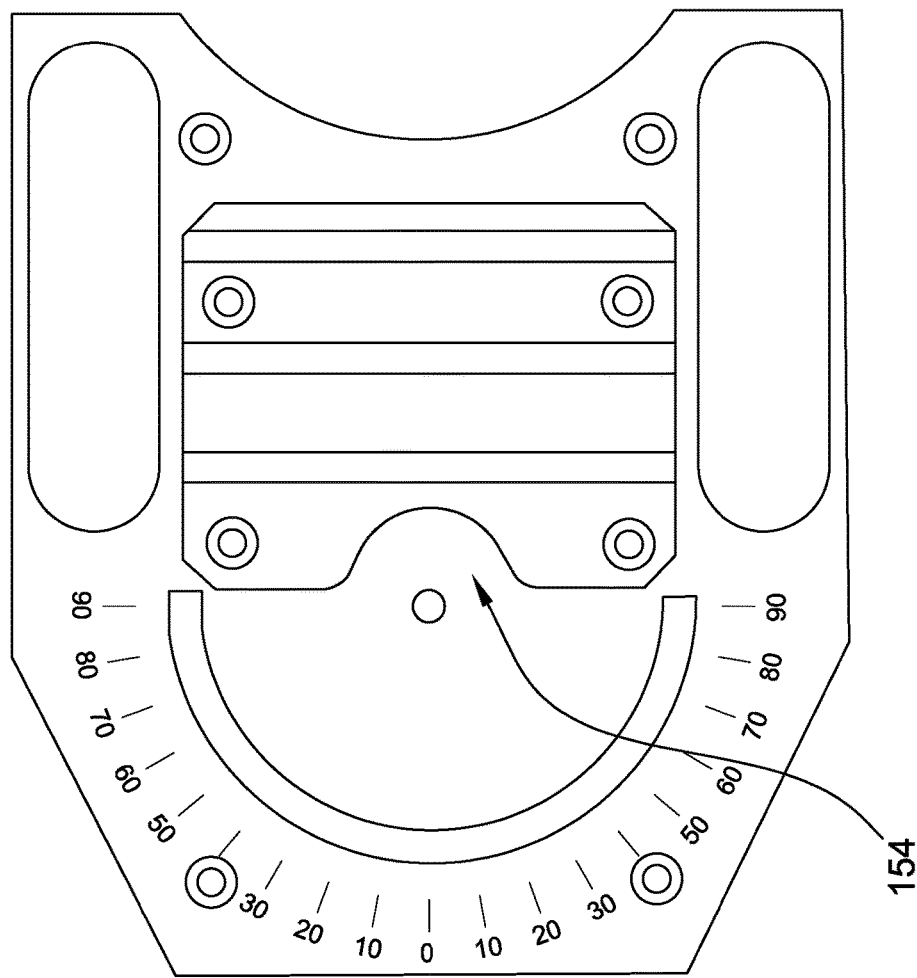
FIG. 3 is an illustration of an alternative calibration device of the system shown in FIG. 1.

Tool support plate 138 also includes a pair of pins 146 coupled with each groove 144. Pins 146 are similar to pins 120 in that pins 146 are slidably engaged with groove 144 to enable movement of pins 146 along grooves 144. Grooves 144 are open-ended at ends 140 and 142 to enable pins to slide into grooves 144. As shown in FIG. 1, a handle 148 of tool 102 is positioned between the pair of pins 146 to restrict movement of handle 148 and to secure handle 148 in position. Tool support plate 138 further includes first side 150 and opposing second side. As shown in FIGS. 1 and 2, sides 150 and 152 are straight between ends 140 and 142 such that sides 150 and 152 are parallel to one another. In another embodiment, shown in FIG. 3, first side 150 includes a notch 154 formed therein to enable tool calibration device to be used with larger tools. The tool calibration device 106 shown in FIG. 3 is otherwise the same as that shown in FIGS. 1 and 2.

In operation, a technician engages a first end 156 of wrench 104 with pin 120 of tool calibration device 106. The technician then aligns an opening (not shown) in a second end 158 of wrench 104 with alignment opening 130 in baseplate 108 of tool calibration device 106. A fastener (not shown) in tool head 134 is then inserted into the opening in second end 158 of wrench 104 to coupled wrench 104 to tool 102. Handle 148 is positioned between pins 146 in tool support plate 138, and pins 146 are adjusted along grooves 144 to restrict movement of handle 148. The technician then slides pin 120 along slot 110 in baseplate 108 to set the orientation of wrench 104 to a predetermined angle with respect to tool head 134. Once the orientation is set, the tool 102 and wrench can be removes from tool calibration device 106 and the fastener on tool head 134 can be tightened to lock wrench 104 into the set orientation.

The embodiments described herein relate generally to a tool calibration system. More specifically, the tool calibration system described herein uses a tool calibration device to facilitate proper alignment of a crow foot wrench and a tool. Previously, a technician may visually inspect the workpiece and estimate the correct angle in which to set the crow foot wrench with respect to the tool in order to complete the required service. However, an improperly aligned wrench may be responsible for leaking pipes or hoses and may result in a shortened service lifetime of the tool. The tool calibration system describe herein enables the technician to engage the crow foot wrench with a moveable pin and then slide the pin along a slot to an angle indicator to adjust the orientation of the crow foot wrench to correspond to a predetermined angle setting with respect to the tool to which the crow foot wrench is coupled. Once the angle is set, the technician can tighten a fastener to maintain the position of the crow foot wrench. As long as the fastener is kept tightened, the technician can confirm the alignment of the tool and crow foot wrench by inserting the tool with the crow foot wrench into the tool calibration device, for example at the beginning of a shift, to verify the crow foot wrench is in the proper orientation.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tool calibration device for use with a tool and a wrench, said device comprising:
    a baseplate comprising an arcuate slot defined therein; and
    a pin coupled to said baseplate and slidably moveable along said slot, wherein said pin is configured to engage the wrench such that movement of said pin along said slot causes rotation of the wrench.

2. The device in accordance with claim 1, wherein said baseplate comprises a scale to indicate an angle of the wrench with respect to the tool.

3. The device in accordance with claim 1, wherein said baseplate comprises an opening configured to receive a portion of the tool to facilitate aligning the tool with the scale.

4. The device in accordance with claim 3, wherein said slot comprises an arc and said opening comprises a center point of said arc.

5. The device in accordance with claim 1, wherein said pin comprises:
    a base portion within said slot and configured to slide along said slot; and
    a post coupled to said base portion and configured to engage the wrench.

6. The device in accordance with claim 5, wherein said baseplate comprises at least one lip that extends partially over said slot, wherein said at least one slot is configured to retain said base portion within said slot.

7. The device in accordance with claim 1, wherein said slot comprises a first end, a second end, and a body portion extending therebetween, wherein said first end and said second end define a first width and said body portion defines a second width smaller than the first width.

8. The device in accordance with claim 1, further comprising a tool support plate coupled to said baseplate and configured to maintain a position of the tool.

9. The device in accordance with claim 8, wherein said tool support plate comprises at least one groove defined therein and a pair of pins moveable along said at least one groove.

10. The device in accordance with claim 9, wherein said pair of pins are positioned on opposing sides of the tool to restrict movement of the tool.

11. The device in accordance with claim 9, wherein said tool support plate comprises a first side and an opposing second side defining a first length therebetween, wherein said at least one groove extends the first length between said first and said second sides.

12. A tool calibration system comprising:
a tool;
a wrench pivotally coupled to said tool;
a tool calibration device coupled to said tool and to said wrench, said tool calibration device comprising:
- a baseplate coupled to said tool and comprising an arcuate slot defined therein; and
- a pin slidably coupled to said slot, wherein said pin is also coupled to said wrench such that movement of said pin along said slot causes rotation of the wrench.

13. The system in accordance with claim 12, wherein said pin comprises:
- a base portioned within said slot and configured to slide along said slot; and
- a post coupled to said base portion and coupled to said wrench.

14. The system in accordance with claim 13, wherein said baseplate comprises at least one lip that extends partially over said slot, wherein said at least one slot is configured to retain said base portion within said slot.

15. The system in accordance with claim 12, wherein said baseplate comprises an opening configured to receive a portion of the tool to facilitate aligning the tool with the scale.

16. The system in accordance with claim 15, wherein said slot comprises an arc and said opening comprises a center point of said arc.

17. The system in accordance with claim 12, wherein said tool comprises a head and a handle, and wherein said wrench comprises a first end coupled to said head and an opposing second end coupled to said pin.

18. The system in accordance with claim 17, wherein said baseplate comprises a tool support plate coupled to said baseplate and configured to maintain a position of said handle.

19. The system in accordance with claim 18, wherein said tool support plate comprises at least one groove defined therein and a pair of pins moveable along said at least one groove, wherein said tool handle is positioned between said pair of pins to restrict movement of the tool handle.

20. The system in accordance with claim 15, wherein said wrench comprises a crow foot wrench.

\* \* \* \* \*